United States Patent

[11] 3,582,042

| [72] | Inventor | Wilfred J. Grenier<br>Rutland, Mass. |
|---|---|---|
| [21] | Appl. No. | 816,555 |
| [22] | Filed | Apr. 16, 1969 |
| [45] | Patented | June 1, 1971 |
| [73] | Assignee | General Industries, Inc.<br>Worcester, Mass. |

[54] EXPANSIBLE PLUG VALVE
7 Claims, 4 Drawing Figs.

[52] U.S. Cl. ............................................. 251/309,
251/317, 251/368
[51] Int. Cl. ............................................. F16k 5/02
[50] Field of Search ............................................. 251/182,
188, 189, 309, 316, 317; 215/53

[56] References Cited
UNITED STATES PATENTS

| 2,822,108 | 2/1958 | Moeller ........................ | 215/53X |
| 3,260,498 | 7/1966 | Johnson ....................... | 251/188X |
| 3,305,211 | 2/1967 | Phillips......................... | 251/309 |
| 3,351,318 | 11/1967 | Jones............................ | 251/188 |

FOREIGN PATENTS

| 112,333 | 11/1944 | Sweden ........................ | 251/309 |

Primary Examiner—Harold W. Weakley
Attorney—Charles R. Fay

ABSTRACT: A valve including a body and a completely removable elastometric valve member therein, including means for expanding the valve member under normal usage thereof whether open or closed or in any position between, said means being releasable to allow removal of said valve member from the valve body, said valve body being open at both sides, the valve member itself closing the openings.

PATENTED JUN 1 1971
3,582,042
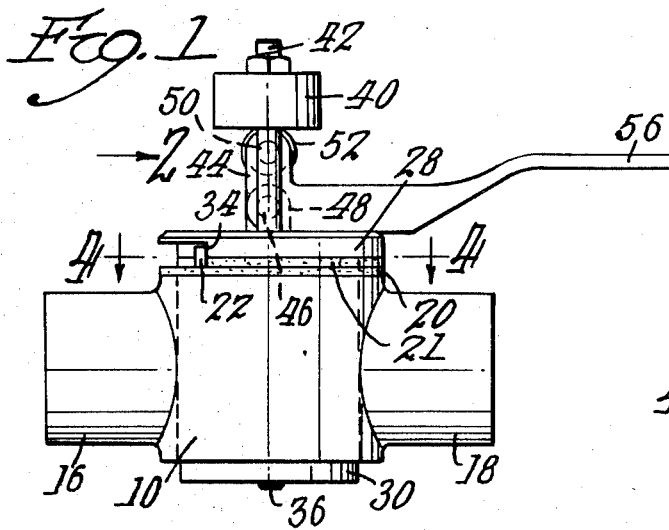
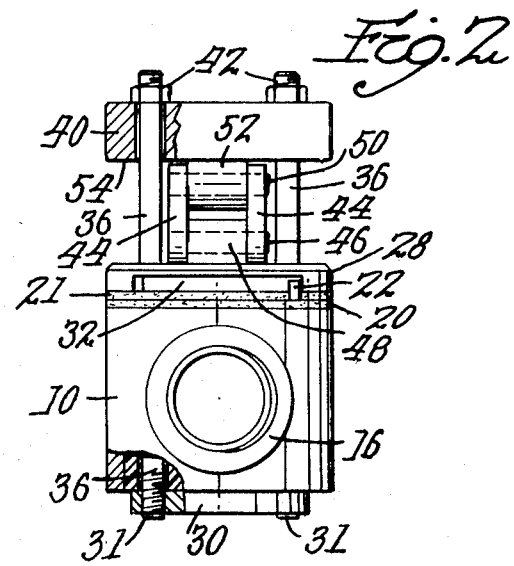
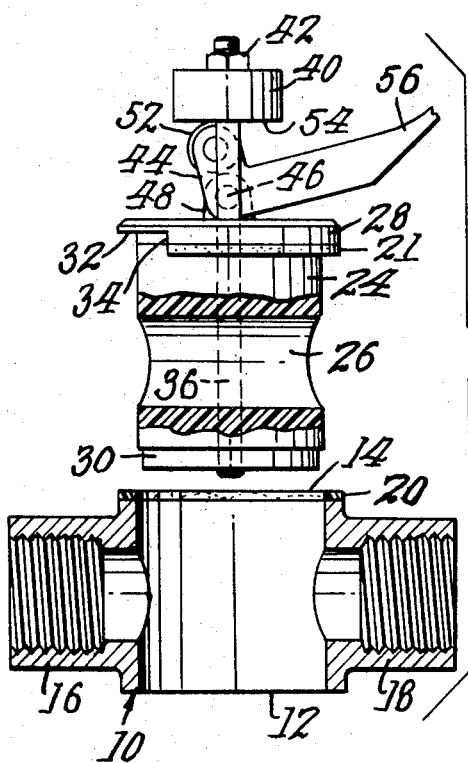
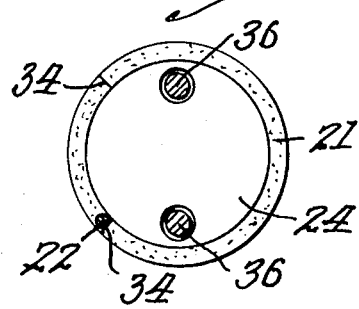
Inventor
Wilfred J. Granier
By Charles R. Fay,
Attorney

EXPANSIBLE PLUG VALVE

BACKGROUND OF THE INVENTION

One of the problems in many kinds of valves is to provide against leakage thereof, particularly in completely removable actuators for sanitary valves.

SUMMARY OF THE INVENTION

This invention provides a valve housing having a pair of oppositely directed pipe connections in a central substantially cylindrical chamber open at both top and bottom. The valve member or actuator is an elastometric plug which is inserted through one opening of said valve housing. It has a flow-through passage and a handle for turning it to open and closed positions.

The handle for turning the valve member also includes means for compressing the plug in an axial direction once it has been correctly located in the valve housing, said handle then being utilized for turning the valve, say for instance a quarter-turn for opening and closing the same, the means expanding the plug being in usage at all times except when it is desired to remove the plug for cleaning when it is easily released.

BRIEF DESCRIPTION OF THE DRAWINGS

FIG. 1 is a view in elevation illustrating the invention;

FIG. 2 is a view in elevation, partly in section, looking in the direction of arrow 2 in FIG. 1;

FIG. 3 is an exploded partly sectional view illustrating the valve actuator removed from the valve housing;

FIG. 4 is a section on line 4—4 of FIG. 1.

PREFERRED EMBODIMENT OF THE INVENTION

In this case the valve housing comprises a cylindrical member 10 which is open at top and bottom as at 12 and 14 and has diametrically opposed pipe connections 16 and 18. At the opening 14 there may be provided a gasket or the like 20 as well as a limit pin 22.

The valve actuator comprises a cylindrical elastometric body 24 having a flow-through opening 26. It has a rigid plate as at 28 and 30 at each end thereof. Plate 28 may be cut away as at 32 to accommodate pin 22 as perhaps best shown in FIG. 2. The cutaway portion 32 has a pair of end shoulders at 34, 34 which limit the degree of turn of the body 24 so as to align the flow-through passage 26 with the pipe connections, and to place it at right angles thereto, closing the valve.

The plate 30 has anchored or secured thereto as at 31, 31 a pair of rods 36, 36 straddling the flow-through opening 26. These rods pass completely through the valve-actuating member 24 and plate 28. At their upper ends, they are provided with a mutual stop means 40 which may be adjustably mounted thereon as shown by the threads at 42.

The plate 28 is provided with a pair of links 44, 44 pivotally mounted by a pin 46 on an abutment 48. At their upper ends links 44, 44 carry a cross pin 50 mounting a roller 52 in close proximity to the undersurface 54 of the member 40, and the links 44, 44 are integrally connected with respect to a handle member 56. The handle 56 is used to turn the member 24 through its 90° of motion to open or close the valve, when the handle is swung in a horizontal plane.

Handle 56 is also capable of being tilted, see FIG. 3, by lifting the handle in the direction of the arrow in FIG. 3. The bottoms of the links 44, 44 impinge on the top of the plate 28 and the roller 52 impinges on the bottom 54 of member 40. Thus when the handle is in the down position of FIG. 1, member 40 and rods 36, 36 are urged upwardly causing plate 30 to tend to rise, but due to the impingement of the links 44, 44 on plate 28, the two plates 28 and 30 are caused to move slightly toward each other and expanding the elastometric valve actuator 24.

Assuming the parts to be disconnected as shown in FIG. 3 with the handle 56 in its up position and the parts relaxed, the valve actuator 24 is inserted into the the valve housing 10 through the opening 14 and comes to rest with the bottom peripheral edge of plate 28 against the gasket at 20. The underside of the plate 28 may also have a gasket 21 should this be desired so that the two gaskets engage each other, see FIG. 1. By moving handle 56 in a clockwise direction from the position shown in FIG. 3 to the position shown in FIG. 1, the rods 36 relatively move upwardly, and the plates 28 and 30 toward each other, expanding the elastometric plug 24 tightly against the interior wall of the cylindrical opening in housing 10, thus providing complete seals against leakage, whether the valve is open or closed, or at any point inbetween. It is not possible to remove the plug 24 from its housing 10, FIG. 1, as long as the handle 54 is in the FIG. 1 position, but when it is moved upwardly to the FIG. 3 position, then the plug is relaxed and can be removed and reinserted.

Having thus described my invention and the advantages thereof, I do not wish to be limited to the details herein disclosed, otherwise than as set forth in the claims, but what I claim is:

1. A valve comprising a housing having a chamber, said chamber having an open top, a valve member comprising an elastometric plug adapted to be positioned in the chamber and to be removed therefrom, said plug having a flow-through opening therein,
    a handle connected to said plug for moving the same in a predetermined direction for opening and closing the valve, a top plate and a bottom plate for said plug, means associated with the plates for expanding the plug laterally, means mounting said handle on the top plate for a separate motion in a different direction,
    means forming a reaction member on said top plate, means associated with said handle applying stress to the top plate and the reaction means in one position of the handle during said motion, and thereby actuating the plug-expanding means.

2. The valve of claim 1 wherein said plug-expanding means tends to cause the plates to approach each other under influence of the handle in its separate motion.

3. The valve of claim 1 wherein said handle has a position releasing said reaction means to allow said plug to relax for application and removal thereof with respect to said housing.

4. The valve of claim 1 wherein said valve housing is open at the bottom, the plug closing the open bottom.

5. The valve of claim 1 wherein said valve housing is open at the bottom, the plug closing the open bottom, said top plate having a diameter greater than the diameter of said chamber.

6. The valve of claim 1 wherein said valve housing is open at the bottom, the plug closing the open bottom, said top plate having a diameter greater than the diameter of said chamber, and the bottom plate having a diameter at least as small as the diameter of said chamber so that it can pass through it and the open bottom.

7. The valve of claim 1 wherein said valve housing is open at the bottom, the plug closing the open bottom, said top plate having a diameter greater than the diameter of said chamber, and the bottom plate having a diameter at least as small as the diameter of said chamber so that it can pass through it and the open bottom, and an annular gasket on the top plate at the undersurface thereof facing the top opening through which the valve plug is inserted.